July 9, 1968  E. I. BETENSKY  3,391,968
GAUSS TYPE FOUR MEMBER PROJECTION OBJECTIVE WITH FINITE
CONJUGATES AND INITIAL PLANO-PARALLEL PLATE
Filed July 9, 1964
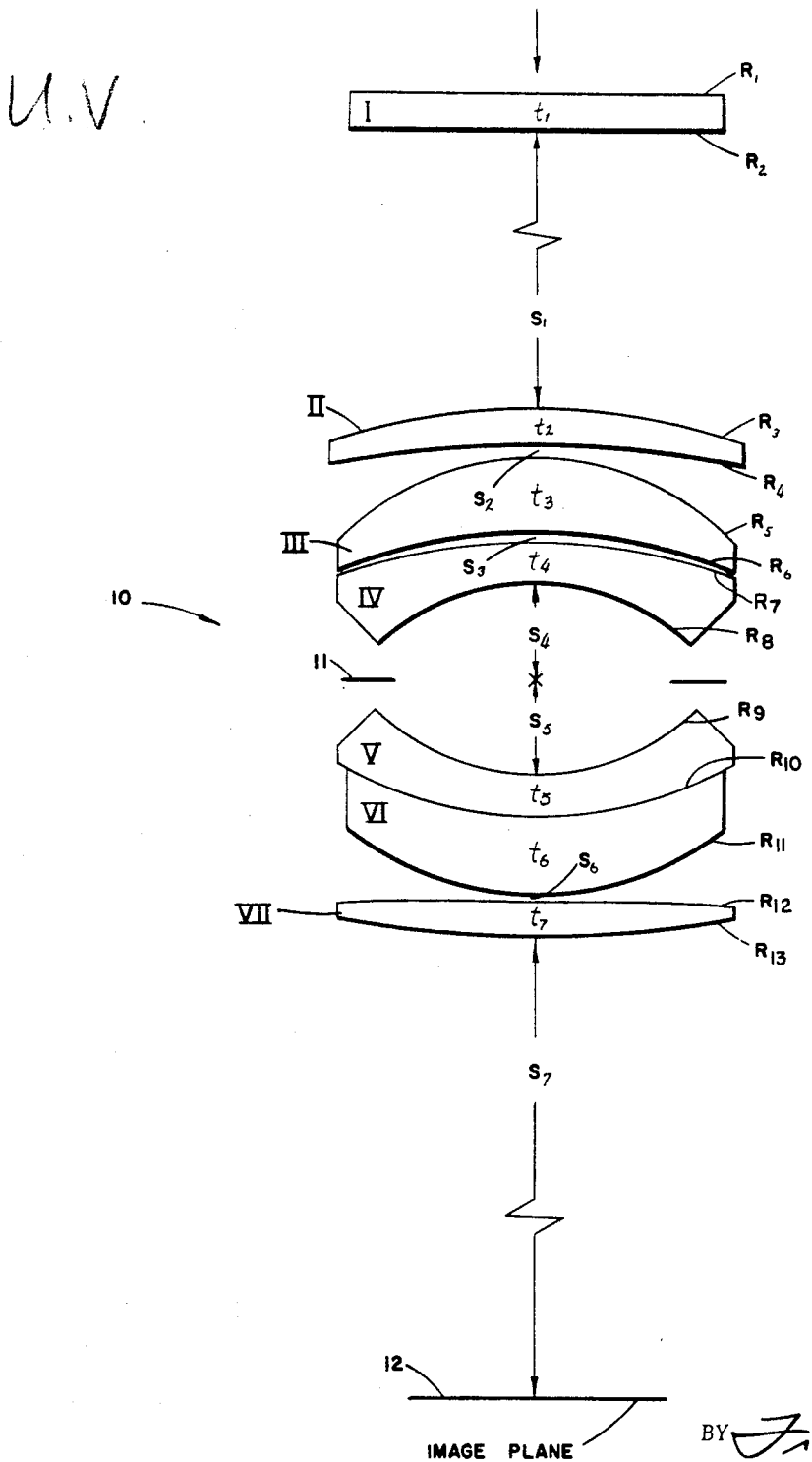
ELLIS I. BETENSKY
INVENTOR
BY Frank C. Parker
ATTORNEY United States Patent Office 3,391,968
Patented July 9, 1968

3,391,968
GAUSS TYPE FOUR MEMBER PROJECTION OBJECTIVE WITH FINITE CONJUGATES AND INITIAL PLANO-PARALLEL PLATE
Ellis I. Betensky, Webster, N.Y., assignor to Bausch & Lomb Incorporated, Rochester, N.Y., a corporation of New York
Filed July 9, 1964, Ser. No. 381,324
3 Claims. (Cl. 350—2)

ABSTRACT OF THE DISCLOSURE

A Gauss type of projection objective composed of four lens members having a relative aperture of f/3.5 and working at a conjugate ratio of 1.8 to 1.0, two negative meniscus lens members being concave toward an intervening diaphragm, said negative lens members lying between a positive meniscus lens member and a double convex lens, said objective including an initial plano-parallel plate and the chromatic as well as mono-chromatic aberrations thereof being exceedingly well corrected when the objective is used in the ultraviolet light rays between 3500 A. and 4300 A. and having low distortion and flat field as well as high resolution.

---

The present invention relates to an optical objective of the Gauss type used for projection purposes at unequal conjugates and more particularly relates to improvements therein.

It is an object of this invention to provide an optical objective of the Gauss type for protection at unequal conjugates of substantially 1.8:1.0, the relative aperture being as large as f/3.5, said objective being comparatively simple in form and of low cost considering the high quality of performance achieved.

A further object is to provide such a device by the use of glasses which transmit light in the ultraviolet range of 3500 A. to 4300 A., the image produced thereby being exceedingly well corrected for chromatic aberration within said range and additionally being corrected in a superior manner for distortion and field curvature as well as spherical aberration, coma, and astigmatism.

Further objects and advantages are to be found in the combination and arrangement of the optical parts of said objective, and in the details of construction thereof as described in the specification herebelow and shown in the accompanying drawing wherein the single figure is an optical diagram showing a preferred form of the present invention.

Basically, the aforesaid objective is a symmetrical type of Gauss lens system of nearly 10″ focal length working at unequal finite conjugates and is used ideally in high resolution projection systems which form an image of a cathode ray tube face or the like at a desired image plane. These cathode ray tubes are characterized by a light emission in the spectral range of 3500 A. to 4300 A. so that a special problem is inherent in formulating a superior lens system which works in this range.

A projection objective which satisfies the above-mentioned requirements is indicated in the drawing by numeral 10, said objective for optical reasons including a front plano-parallel plate designated I which may be the face plate of a cathode ray tube, the information to be transmitted appearing on the first surface of said plate.

Further comprised in said objective 10 is a positive singlet lens member of meniscus form which is designated II, said member being axially spaced in optical alignment with plate I at a distance which is designated $S_1$ in the direction of entrant light. The axial thicknesses for the optical parts I and II are designated respectively $t_1$ and $t_2$.

Spaced rearwardly at an axial distance designated $S_2$ from lens member II is a pair of negative meniscus doublet lens members which are individually spaced axially from an intervening diaphragm 11, the front and rear axial spaces being designated $S_4$ and $S_5$ respectively.

The negative meniscus doublets are optically aligned on a common axis with the other component lenses, and the front doublet consists of a front positive meniscus lens element designated III and a rear negative meniscus lens element designated IV and separated therefrom at an axial distance designated $S_3$.

Composed in the rear doublet lens member are a front negative meniscus lens element designated V and a rear positive meniscus lens element designated VI and lying in contact therewith along an interface. Said interface as well as all of the lens elements thus far mentioned are all concave toward the diaphragm 11.

Lastly, a double convex lens member designated VII is aligned with the other lenses at an axial spacing designated $S_6$ rearwardly of element VI, and located at an axial distance designated $S_7$ from a final image plane 12.

The aforesaid improvements in optical performance of such an optical objective 10 working in ultraviolet light are achieved in a large measure by the advantageous optical properties and constructional data which characterize the objective.

Accordingly, the values of equivalent focal lengths of the component optical parts I to VII are specified in the table herebelow wherein F designates the equivalent focal length of the objective, and $F_I$ to $F_{VII}$ designate the individual equivalent focal lengths of the respective parts I to VII, $$F_I = \infty$$
$$1.082\ F < F_{II} < 1.194\ F$$
$$.615\ F < F_{III} < .679\ F$$
$$3.204\ F < -F_{IV} < 3.544\ F$$
$$.648\ F < -F_V < .716\ F$$
$$1.085\ F < F_{VI} < 1.199\ F$$
$$1.106\ F < -F_{VII} < 1.222\ F$$

the minus (—) sign used in the table meaning negative focal length.

The equivalent focal length of the first doublet lens member III, IV has a numerical value which is substantially .1928 times the corresponding value of said second doublet lens member V, VI.

Ideally, the equivalent focal lengths $F_I$ to $F_{VII}$ should be as stated in the table herebelow.

$F_I = \infty$
$F_{II} = 1.138\ F$
$F_{III} = .647\ F$
$-F_{IV} = 3.374\ F$
$-F_V = .682\ F$
$F_{VI} = 1.142\ F$
$-F_{VII} = 1.164\ F$ Furthermore, advantageous constructional data are specified for said optical parts I to VII in the table of values herebelow wherein $R_1$ to $R_{13}$ represent the radii of the successive refractive lens surfaces, the minus $(-)$ sign used therewith signifying lens surfaces which are concave towrad entrant rays, $t_1$ to $t_7$ represent the successive axial lens thicknesses, and $S_1$ to $S_7$ designate the successive axial air spaces up to the image plane 12.

$R_1 = $ Plano
$R_2 = $ Plano
$.452\ F < R_3 < .500\ F$
$2.026\ F < R_4 < 2.240\ F$
$.1864\ F < R_5 < .2060\ F$
$.3924\ F < R_6 < .4336\ F$
$.420\ F < R_7 < .464\ F$
$.1565\ F < R_8 < .1741\ F$
$.1628\ F < -R_9 < .1798\ F$
$.3024\ F < -R_{10} < .3236\ F$
$.2100\ F < -R_{11} < .2320\ F$
$3.730\ F < R_{12} < 4.130\ F$
$.703\ F < -R_{13} < .777\ F$
$.02290\ F < t_1 < .02530\ F$
$.02602\ F < t_2 < .02894\ F$
$.05170\ F < t_3 < .05710\ F$
$.0290\ F < t_4 < .0320\ F$
$.0290\ F < t_5 < .0320\ F$
$.0558\ F < t_6 < .0616\ F$
$.0253\ F < t_7 < .0279\ F$
$2.4350\ F < S_1 < 2.6910\ F$
$.00380\ F < S_2 < .00420\ F$
$.00355\ F < S_3 < .00393\ F$
$.973\ F < S_4 < 1.075\ F$
$.0905\ F < S_5 < .0999\ F$
$.000724\ F < S_6 < .000800\ F$
$1.1770\ F < S_7 < 1.3010\ F$ Ideally, the above-recited values are specified in the table herebelow,

| | |
|---|---|
| $R_1 = $ Plano | $t_2 = .02738\ F$ |
| $R_2 = $ Plano | $t_3 = .05440\ F$ |
| $R_3 = .4760\ F$ | $t_4 = .03050\ F$ |
| $R_4 = 2.1330\ F$ | $t_5 = 03050\ F$ |
| $R_5 = .1962\ F$ | $t_6 = .05870\ F$ |
| $R_6 = .4130\ F$ | $t_7 = .02660\ F$ |
| $R_7 = .4420\ F$ | $S_1 = 2.5630\ F$ |
| $R_8 = .1658\ F$ | $S_2 = .00400\ F$ |
| $-R_9 = .1713\ F$ | $S_3 = .00374\ F$ |
| $-R_{10} = .3130\ F$ | $S_4 = .10240\ F$ |
| $-R_{11} = .2210\ F$ | $S_5 = .09520\ F$ |
| $R_{12} = 3.9300\ F$ | $S_6 = .000762\ F$ |
| $-R_{13} = .7400\ F$ | $S_7 = 1.2390\ F$ |
| $t_1 = .02410\ F$ | |

All of the glasses used in the objective 10 are so chosen as to maximize the transmission of light in the near ultraviolet range so as to match as nearly as possible the emission of P-16 phosphor which is deposited on surface $R_1$ of the cathode ray face plate I. Accordingly, the refractive index of the glass used in lenses II, III, VI and VII is specified in the range of values between 1.512 and 1.522, and ideally is a value of 1.517. The corresponding values for Abbe number lies between 61.0 and 67.0, and ideally is a value of 64.0, all of which values are based on the usual specification for light having a wavelength equal to the D line of the visible spectrum.

The negative lenses IV and V have corresponding values between 1.568 and 1.578, the ideal value being 1.573, and have an Abbe number value of between 42.0 and 46.0, the ideal value being 42.7.

Constructional data for a successful and preferred form of the objective 10 is given in the chart of values herebelow, the meaning of the symbolisms used therein being the same as hereabove set forth.

Equivalent Focal Length = 262.6   f/3.5   Magnification = 1.8:1.0

| Part | Radii | Thicknesses | Spaces | $nS$ | S |
|---|---|---|---|---|---|
| I | $R_1 = $ Plano<br>$R_2 = $ Plano | $t_1 = 6.35$ | | 1.519 | |
| | | | $S_1 = 670.033$ | | |
| II | $R_3 = 125.04$<br>$R_4 = 561.30$ | $t_2 = 7.20$ | | 1.517 | 64.0 |
| | | | $S_2 = 1.05$ | | |
| III | $R_5 = 51.692$<br>$R_6 = 108.488$ | $t_3 = 14.3$ | | 1.517 | 64.0 |
| | | | $S_3 = 0.975$ | | |
| IV | $R_7 = 115.871$<br>$R_8 = 43.652$ | $t_4 = 8.00$ | | 1.573 | 42.7 |
| | | | $S_4 = 27.0$<br>$S_5 = 25.68$ | | |
| V | $-R_9 = 45.108$<br>$-R_{10} = 82.415$ | $t_5 = 8.00$ | | 1.573 | 42.7 |
| VI | $-R_{11} = 57.979$ | $t_6 = 15.4$ | | 1,517 | 64.0 |
| | | | $S_6 = 0.02$ | | |
| VII | $R_{12} = 1032.60$<br>$-R_{13} = 194.35$ | $t_7 = 7.00$ | | 1.517 | 64.0 |
| | | | $S_7 = 326.3$ | | |

NOTE.—All scalar dimensions are given in millimeters.

Although only a preferred embodiment of the present invention has been shown and described in detail, other embodiments are possible and changes may be made in the constructional data within the stated values without departing from the spirit of the invention as set forth in the appended claims.

I claim:

1. A projection objective having a relative aperture at least as large as f/3.5 and being of the Gauss type and working at substantially 1.8:1.0 demagnification with the long conjugate located on the object side, said objective being designed for use in ultraviolet light, said objective comprising a plano-parallel front optical plate on the side of the entrant rays designated I, a positive meniscus singlet lens member which is designated II and is spaced at an axial distance designated $S_1$ from said plate, said member being concave toward a central diaphragm, a negative meniscus shaped doublet lens member spaced rearwardly at an axial distance designated $S_2$ from member II, said doublet lens being concave toward said diaphragm and consisting of a positive meniscus lens element designated III and a negative lens element designated IV spaced therefrom by an axial distance designated $S_3$, both elements being concave toward said diaphragm which is spaced from said negative element at an axial distanc designated $S_4$, a second negative meniscus shaped doublet lens member spaced rearwardly from said diaphragm at an axial distance $S_5$ and being concave thereto, said doublet member consisting of a front negative meniscus lens element designated V which lies in contact along an interface with a positive meniscus lens element designated VI, both elements being concave to said diaphragm, and a double convex singlet lens member designated VII spaced at an axial distance designated $S_6$ rearwardly from said element VI and spaced at an image distance designated $S_7$ from an image plane, one form of said objective having specific values for its optical properties substantially as set forth in the table of mathematical statements herebelow wherein $F_I$ to $F_{VII}$ designate the equivalent focal lengths of the successive optical parts I to VII and the minus (—) sign used therewith signifies negative focal length, the equivalent focal length of said objective being represented by F, $t_1$ to $t_7$ designating the successive axial thicknesses of the optical parts I to VII, and $S_1$ to $S_7$ representing the successive axial air spaces to the image plane, $$F_I = \infty$$
$$F_{II} = 1.138\ F$$
$$F_{III} = .647\ F$$
$$-F_{IV} = 3.374\ F$$
$$-F_V = .682\ F$$
$$F_{VI} = 1.142\ F$$
$$-F_{VII} = 1.164\ F$$

the equivalent focal length of the first doublet lens members having a numerical value which is substantially .1928 times the corresponding value of said second doublet lens member,

| | |
|---|---|
| $t_1 = .02410\ F$ | $S_1 = 2.5630\ F$ |
| $t_2 = .02738\ F$ | $S_2 = .00400\ F$ |
| $t_3 = .05440\ F$ | $S_3 = .00374\ F$ |
| $t_4 = .03050\ F$ | $S_4 = .10240\ F$ |
| $t_5 = .03050\ F$ | $S_5 = .09520\ F$ |
| $t_6 = .05870\ F$ | $S_6 = .000762\ F$ |
| $t_7 = .02660\ F$ | $S_7 = 1.2390\ F$ |

2. A projection objective having a relative aperture at least as large as f/3.5 and being of the Gauss type and working at substantially 1.8:1.0 demagnification with the long conjugate located on the object side, said objective being designed for use in ultraviolet light, said objective comprising a plano-parallel front optical plate on the side of the entrant rays designated I, a positive meniscus singlet lens member which is designated II and is spaced at an axial distance designated $S_1$ from said plate, said member being concave toward a central diaphragm, a negative meniscus shaped doublet lens member spaced rearwardly at an axial distance designated $S_2$ from member II, said doublet lens being concave toward said diaphragm and consisting of a positive meniscus lens element designated III and a negative lens element designated IV spaced therefrom by an axial distance designated $S_3$, both elements being concave toward said diaphragm which is spaced from said negative element at an axial distance designated $S_4$, a second negative meniscus shaped doublet lens member spaced rearwardly from said diaphragm at an axial distance $S_5$ and being concave thereto, said doublet member consisting of a front negative meniscus lens element designated V which lies in contact along an interface with a positive meniscus lens element designated VI, both elements being concave to said diaphragm, and a double convex singlet lens member designated VII spaced at an axial distance designated $S_6$ rearwardly from said element VI and spaced at an image distance designated $S_7$ from an image plane, the constructional data related to one form of said objective having absolute values substantially as set forth in the table of mathematical statements given herebelow wherein $R_1$ to $R_{13}$ represent the radii of the successive optical surfaces on the optical parts I to VII, the minus (—) sign used therewith signifying lens surfaces which are concave toward entrant rays, the equivalent focal length of said objective being represented by F, $t_1$ to $t_7$ designate the successive axial thicknesses of the optical parts, and $S_1$ to $S_7$ designate the successive axial surfaces to the image plane,

| | |
|---|---|
| $R_1 =$ Plano | $t_1 = .02410\ F$ |
| $R_2 =$ Plano | $t_2 = .02738\ F$ |
| $R_3 = .4670\ F$ | $t_3 = .05440\ F$ |
| $R_4 = 2.1330\ F$ | $t_4 = .03050\ F$ |
| $R_5 = .1962\ F$ | $t_5 = .03050\ F$ |
| $R_6 = .4130\ F$ | $t_6 = .05870\ F$ |
| $R_7 = .4420\ F$ | $t_7 = .02660\ F$ |
| $R_8 = .1658\ F$ | $S_1 = 2.5630\ F$ |
| $-R_9 = .1713\ F$ | $S_2 = .00400\ F$ |
| $-R_{10} = .3130\ F$ | $S_3 = .00374\ F$ |
| $-R_{11} = .2210\ F$ | $S_4 = .10240\ F$ |
| $R_{12} = 3.9300\ F$ | $S_5 = .09520\ F$ |
| $-R_{13} = .7400\ F$ | $S_6 = .000762\ F$ |
| | $S_7 = 1.2390\ F$ | the equivalent focal length of the first doublet lens member having a numerical value which is substantially .1928 times the corresponding value of said second doublet lens member.

3. A projection objective having a relative aperture at least as large as f/3.5 and being of the Gauss type and working at substantially 1.8:1.0 demagnification with the long conjugate located on the object side, said objective being designed for use in ultraviolet light, said objective comprising a plano-parallel front optical plate on the side of the entrant rays designated I, a positive meniscus singlet lens member which is designated II and is spaced at an axial distance designated $S_1$ from said plate, said member being concave toward a central diaphragm, a negative meniscus shaped doublet lens member spaced rearwardly at an axial distance designated $S_2$ from member II, said doublet lens being concave toward said diaphragm and consisting of a positive meniscus lens element designated III and a negative lens element designated IV spaced therefrom by an axial distance designated $S_3$, both elements being concave toward said diaphragm which is spaced from said negative element at an axial distance designated $S_4$, a second negative meniscus shaped doublet lens member spaced rearwardly from said diaphragm at an axial distance $S_5$ and being concave thereto, said doublet member consisting of a front negative meniscus lens element designated V which lies in contact along an interface with a positive meniscus lens element designated VI, both elements being concave to said diaphragm, and a double convex singlet lens member designated VII spaced at an axial distance designated $S_6$ rearwardly from said element VI and spaced at an image distance designated $S_7$ from an image plane, the constructional data related to a preferred form of said objective having specific values as given in the chart herebelow wherein $R_1$ to $R_{13}$ represent the radii of the successive optical surfaces on the optical parts I to VII, the minus (—) sign used therewith signifying lens surfaces which are concave toward entrant rays, $t_1$ to $t_7$ designate the successive axial thicknesses of the optical parts, $S_1$ to $S_7$ designate the successive axial air spaces up to the image plane, and $n_D$ and $\nu$ designate respectively the refractive index for the D line of the spectrum and Abbe number for the glasses in said optical parts, Equivalent Focal Length=262.6  f/3.5  Magnification=1.8:1.0

| Part | Radii | Thicknesses | Spaces | $n_D$ | $\nu$ |
|---|---|---|---|---|---|
| I | $R_1$=Plano<br>$R_2$=Plano | $t_1$=6.35 | $S_1$=670.033 | 1.519 | |
| II | $R_3$=125.04<br>$R_4$=561.30 | $t_2$=7.20 | $S_2$=1.05 | 1.517 | 64.0 |
| III | $R_5$=51.692<br>$R_6$=108.488 | $t_3$=14.3 | $S_3$=0.975 | 1.517 | 64.0 |
| IV | $R_7$=115.871<br>$R_8$=43.652 | $t_4$=8.00 | $S_4$=27.0 | 1.573 | 42.7 |
| V | $-R_9$=45.108 | $t_5$=8.00 | $S_5$=25.68 | 1.573 | 42.7 |
| VI | $-R_{10}$=82.415<br>$-R_{11}$=57.979 | $t_6$=15.4 | $S_6$=0.02 | 1.517 | 64.0 |
| VII | $R_{12}$=1032.60<br>$-R_{13}$=194.35 | $t_7$=7.00 | $S_7$=326.3 | 1.517 | 64.0 |

NOTE.—All scalar dimensions are given in millimeters.

References Cited

UNITED STATES PATENTS 2,683,396  7/1954  Klemt et al. ........ 350—218
3,035,490  5/1962  Tibbetts .......... 350—216 X

FOREIGN PATENTS 867,261  5/1961  Great Britain.

DAVID H. RUBIN, *Primary Examiner.*
JOHN K. CORBIN, *Examiner.*
R. J. STERN, *Assistant Examiner.*